United States Patent [19]
Hellerhoff et al.

[11] Patent Number: 4,630,349
[45] Date of Patent: Dec. 23, 1986

[54] METHOD FOR ASSEMBLING TWO-WAY TRANSMISSION GEARS WITH POWER DISTRIBUTION

[75] Inventors: Josef Hellerhoff, Lowick; Peter Bunse, Rees, both of Fed. Rep. of Germany; Hans te Beest, Dinxperlo, Netherlands

[73] Assignee: A. Friedr. Flender GmbH & Co. KG, Bocholt, Fed. Rep. of Germany

[21] Appl. No.: 728,570

[22] Filed: Apr. 29, 1985

[30] Foreign Application Priority Data

May 18, 1984 [DE] Fed. Rep. of Germany ....... 3418543

[51] Int. Cl.$^4$ .................. B23P 11/00; F16H 5/52
[52] U.S. Cl. ........................... 29/434; 29/407; 29/464; 74/810
[58] Field of Search ............ 29/407, 434, 464; 74/410, 412 R, 413, 421 R, 810

[56] References Cited
U.S. PATENT DOCUMENTS 4,083,094 4/1978 Silvestri ............... 29/434 X
4,472,869 9/1984 Yasui et al. ............ 29/434

FOREIGN PATENT DOCUMENTS 2518115 8/1978 Fed. Rep. of Germany .
0136161 11/1978 Japan ..................... 29/434

Primary Examiner—Howard N. Goldberg
Assistant Examiner—R. S. Wallace
Attorney, Agent, or Firm—Felfe & Lynch

[57] ABSTRACT

Two-way transmission gears in which each power branch includes an intermediate shaft, each shaft being mounted for rotation in a different (separate) gear case portion, and in which the power distribution is effected by means of an axially freely adjustable shaft provided with double helical teeth extending in opposite directions, require for the assembling and disassembling thereof and for adjustment purposes at least one gear which is positioned for displacement and adjustment relative to another gear disposed on the same shaft. In the subject matter of the invention, it is contemplated normally to do without a displaceable and adjustable gear, in that the power-distributing shaft provided with pinions having oppositely extending helical teeth is axially displaced or shifted during the assembly or disassembly. A method for assembling two-way transmission gears is disclosed, also.

6 Claims, 5 Drawing Figures

METHOD FOR ASSEMBLING TWO-WAY TRANSMISSION GEARS WITH POWER DISTRIBUTION

BACKGROUND OF THE INVENTION

The present invention relates to a power-distributing two-way transmission gear and a method of assembling same German Patent (DE-PS) 25 18 115 (Aug. 31, 1978) shows a transmission gear of this kind, the power branches of which drive a large gear through a spur gear stage. In this transmission gear, however, assembly and disassembly is possible only when at least one gear including the associated pinion of one power branch is provided to be adjustable exteriorly. When assembling has been effected, it is further necessary to precisely adjust the gear and the pinion in order to satisfy the structurally pre-given conditions.

SUMMARY OF THE INVENTION

It is the object of the invention to provide a method and a two-way transmission gear in which the adjustability of the gear and of the associated pinion in the power branches may be dispensed with, without being compelled to depart from the compact and low-weight construction.

For the solution of this object, the invention proposes a method and a power-distributing two-way transmission gear of the type as described in the patent claims. Owing to the geometrical relationships, transmission gears of the generic type may be assembled when they include adjustable gear/shaft connections, such that two gear meshings which engage radially in different directions, are established by rolling or camming with simultaneous rotation of gear and pinion relative to each other.

The proposed method fully dispenses with the adjustable gear/shaft connection. Relative rotating of gear and pinion is replaced by the axial displacement or shifting of the power-distributing shaft having pinions with teeth of opposite pitch. Hereby, the two power branches are rotated in opposite directions, such that the meshing taking place in different directions may be engaged and disengaged, respectively. By an initial radial engagement of one of the two meshings to be engaged, the necessary axial shifting distance is shortened substantially. Likewise, optionally the necessary shifting distance is limited by the minimum width of engagement or mesh of one pair of gears. Also, the requisite shifting distance may be reduced by choosing an optimum position of the gears to be engaged with eath other.

BRIEF DESCRIPTION OF THE DRAWINGS

The invention is described in greater detail with reference to drawings, wherein.

DESCRIPTION OF THE PREFERRED EMBODIMENT

Figure 1:
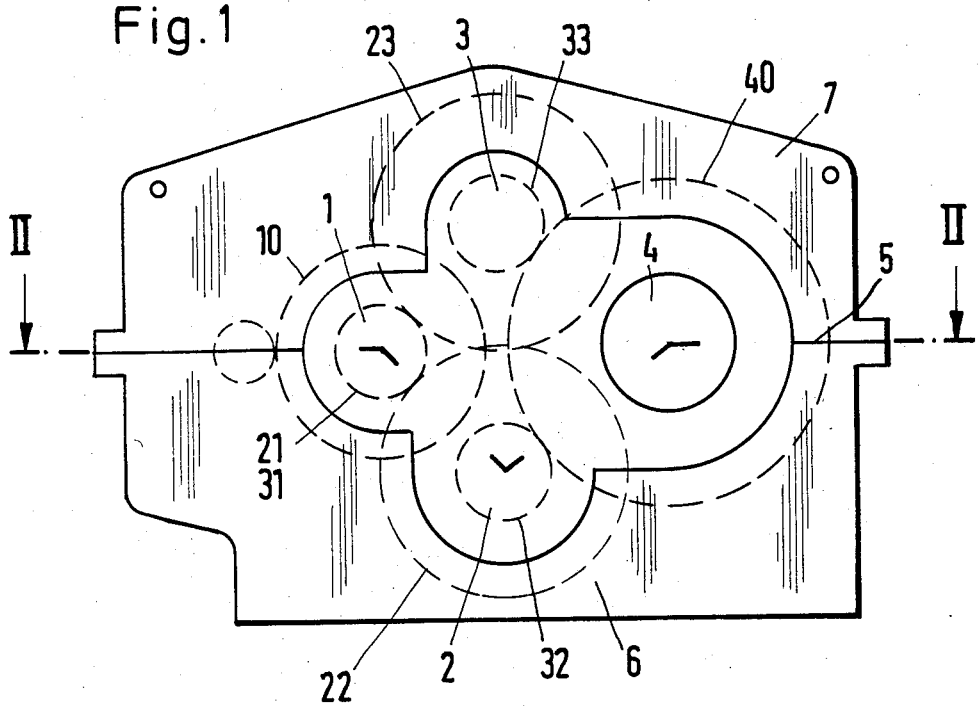
FIG. 1 illustrates a two-way transmission gear in schematical side elevational view.
Figure 2:
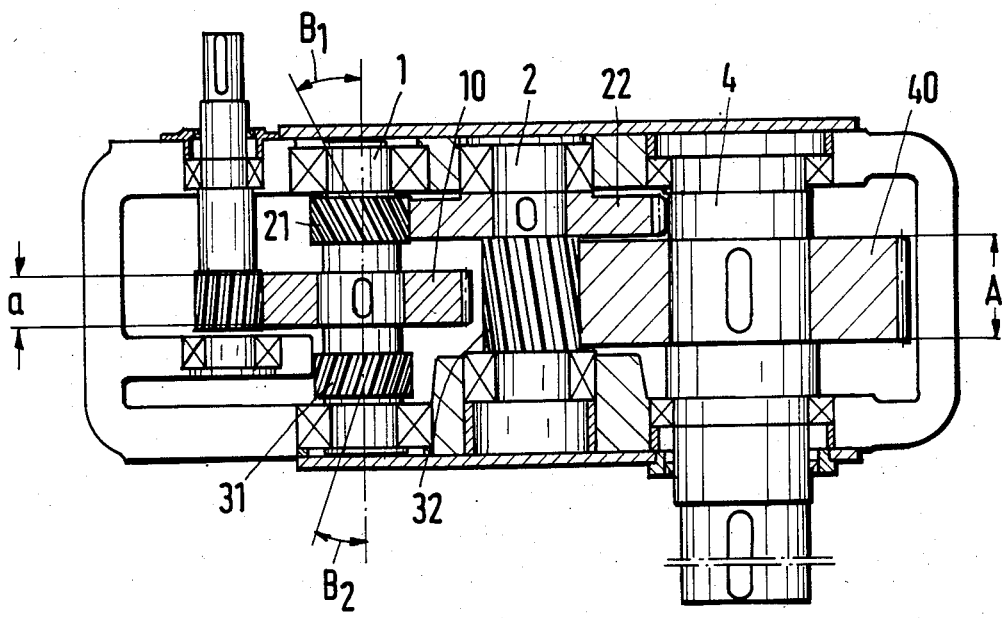
FIG. 2 shows the transmission gear in sectional view taken along lines II—II in FIG. 1.

FIGS. 1 and 2 illustrate a power-distributing two-way transmission gear in its assembled state. The lower power branch comprises the intermediate shaft 2 including the gear 22 and the pinion 32, which is mounted (for rotation) in the lower portion 6 of the gear case. The upper power branch comprises the intermediate shaft 3 including the gear 23 and the pinion 33, which is mounted in the upper portion 7 of the gear case. Gears 22, 23 mesh with the oppositely helically geared pinions 21, 31 of the power-distributing shaft 1 which is mounted for axial adjustment in the partition joint 5 of the gear case. Both pinions 32, 33 are in mesh with the power-combining gear (driven gear) 40 which is likewise mounted in the gear case joint 5 by means of the driven or output shaft 4. Gear 22 and pinon(s) 32 as well as 23 and 33 are joined together for joint rotation and so as to be not adjustable relative to each other. The power-distributing (power-branching) shaft 1 is driven through a driving gear 10.

Figure 3:
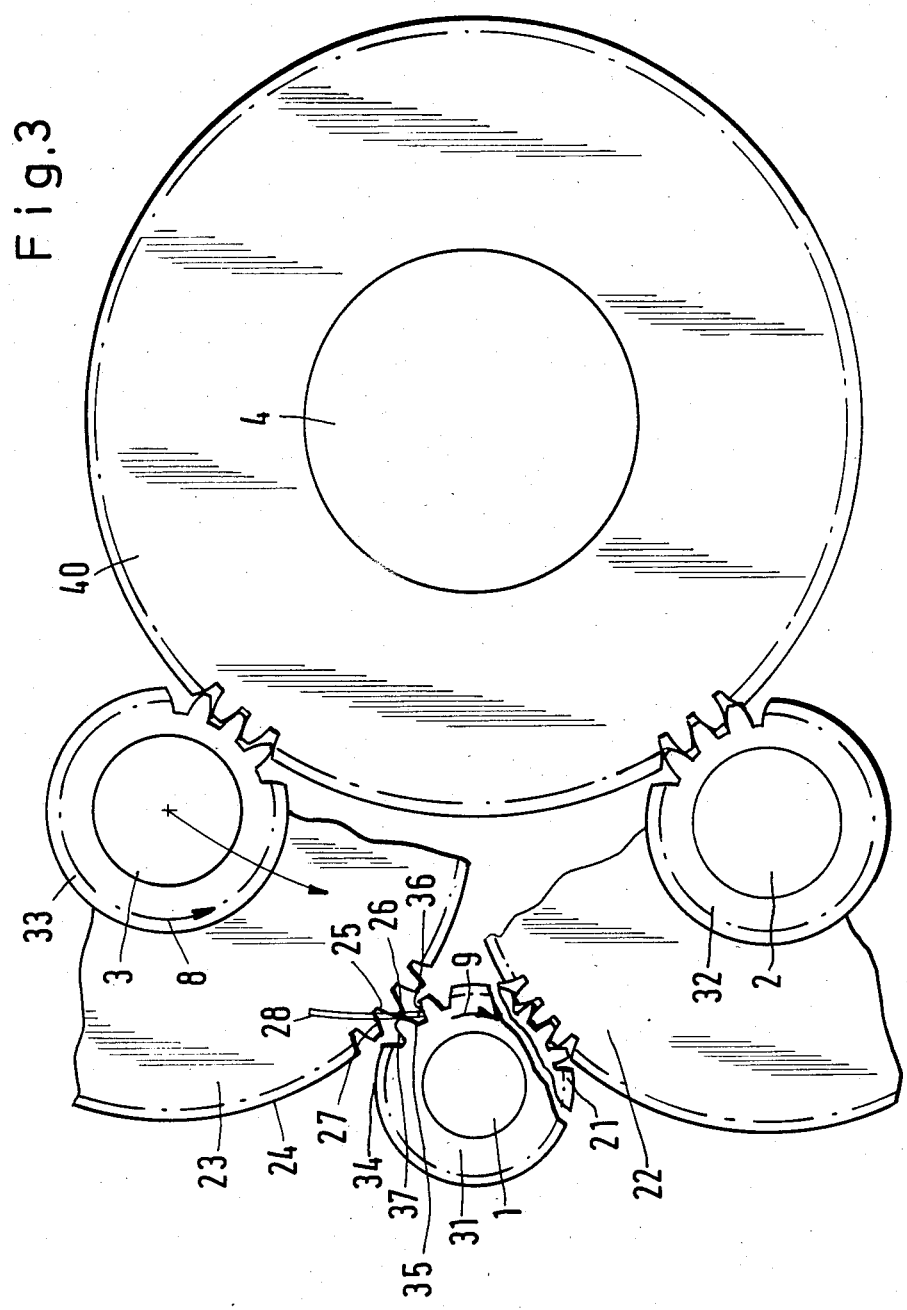
FIG. 3 shows the position of gears 23 and 31 during assembling immediately before establishing the meshed engagement.
Figure 4:
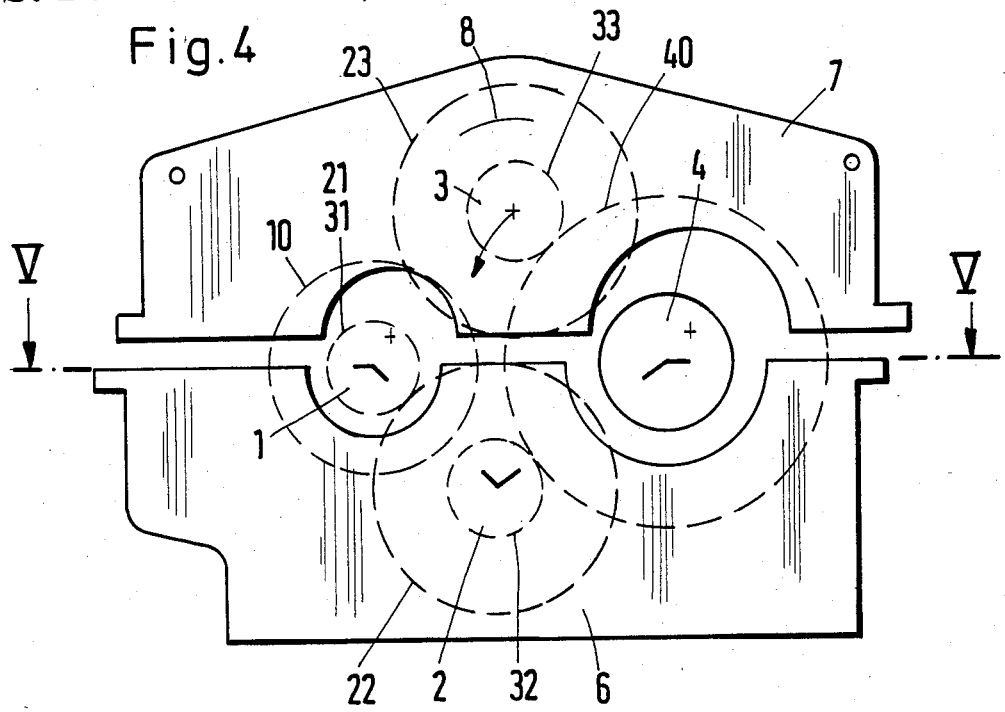
FIG. 4 is a schematical side elevational view of a two-way transmission gear in the course of assembling, with the upper gear pinion meshing with the gear of the output (driven) shaft.
Figure 5:
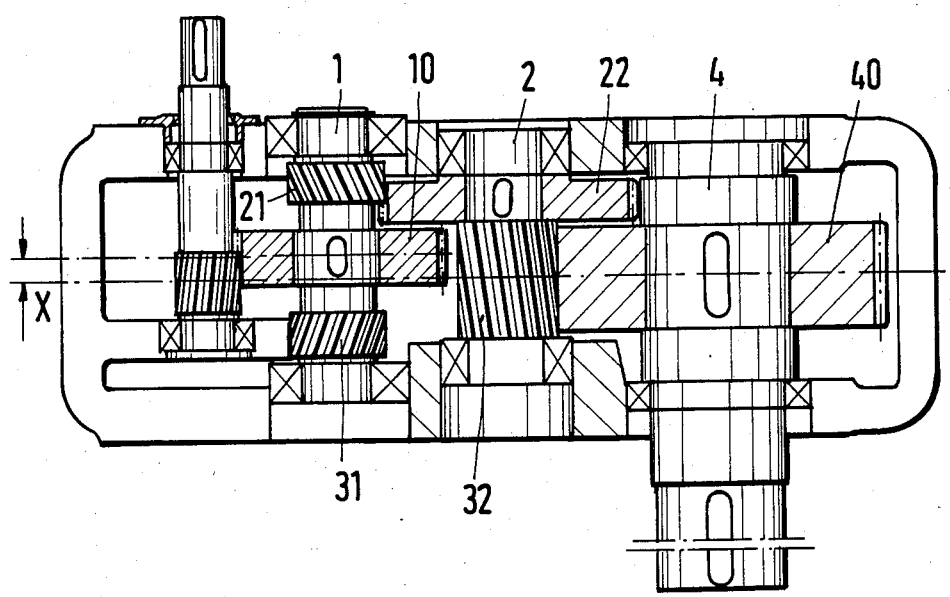
FIG. 5 shows a two-way transmission gear in sectional view taken along lines V—V in FIG. 4, with shaft 1 being inserted as displaced by the distance x.

FIGS. 3, 4 and 5 illustrate a transmission gear in its state of being assembled. In FIG. 3, the pinion 33 of the upper power branch has been brought into full engagement (mesh) with the gear 40, while the outer peripheries or head circles 24 and 34 of gears 23 and 31 are just in contact with each other. Consequently, the upper portion 7 of the gear case does not yet rest upon the lower portion 6 of the gear case; FIG. 4. At this time, the power-distributing shaft 1 is placed into the half bores of the lower gear case portion in a position as displaced by the distance x (FIG. 5) relative to its operational position.

In order to better illustrate the assembling method, it may be assumed that the driven or output shaft 4, and therefore also the intermediate shaft 2, is locked against rotation within the lower portion 6 of the gear case. When the upper portion 7 of the gear case is lowered further, the pinion 33 cams along the peripheral surface of the gear 40 (arrow), whereby the gear 23, being connected to the pinion for joint rotation, rotates outwards to the left (arrow 8).

At the same time, the head circle (outer peripheral surface) 24 of gear 23 intersects the head circle 34 of pinion 31. Here, when the crest of a tooth of gear 23 meets the crest of a tooth of pinion 31, shaft 1 is displaced axially towards its operational position, whereby the meshing helical teeth of gears 21 and 22 cause the shaft 1, and thereby also the pinion 31, to rotate to the right (arrow 9). Owing to the oppositely inclined teeth of the pinions 31 and 21, the displacement additionally causes a relative rotation of the teeth of pinion 31 relative to the momentarily stationary teeth of gear 23, likewise in the direction of rotation to the right. Thus, the rotating effect is enhanced by the double helical gearing. As soon as a pair of tooth crests do not face each other, but tooth crest and tooth space do, the upper portion of the gear case may be lowered further until a rear tooth flank 26 of gear 23 contacts a front tooth flank 36 of pinion 31. Upon still further lowering of the upper portion of the gear case, the power-distributing shaft 1 is further displaced or shifted axially up to the operational position, whereby the above-described rotating effect is brought about and free meshed engagement of pinion 31 and gear 23 takes place.

In disassembling, i.e., when lifting the gear case upper portion off the gear case lower portion, shaft 1 is simultaneously shifted in the opposite direction, whereby pinion 31 and gear 23 are disengaged from each other first, whereupon pinion 33 and gear 40 are freely disengaged from each other.

In order to keep as small as possible the distance x of shifting or displacement of shaft 1, or the necessary angle of rotation, respectively, it is advantageous when in the pinion 31 and the gear 23 one tooth of the gear already faces a tooth space of the opposite gear at the point of time when the teeth come into mesh with each other, i.e., when the head circles 34 and 24 contact each other.

Still better is when at the time of contact between the head circles 34 and 24 the front flank (face) 25 of gear 23 is just about to contact the rear flank 35 of the pinion. Owing to the rolling or camming movement of the pinion 33 in the already engaged gearing (teeth) of the gear 40, the teeth of the gear 23 secured to the same intermediate shaft 3 describe epicycloids. When the front tooth flank 25, upon contact between the head circles 34 and 24, just slides past the rear tooth flank 35, then the tooth defined (produced) by flanks 25 and 26, while making use of the momentarily existing tooth play, may rotate (engage) into the tooth space formed by flanks 35 and 36 without rotation of the pinion 31—following an epicycloid 28—until the rear flank 26 or 27 of the tooth contacts the front tooth flank 36 or 37. This constitutes the most favorable position of the teeth of pinion 31 and gear 23 at the start of their engagement; although this requires a very specific position of all gears in mesh with each other, it provides for a minimum distance x of the requisite displacement and, thus, of the necessary angle of rotation of shaft 1. For reasons of completeness, it may be noted that the angle of rotation and the distance x of the path of displacement are determined by a mathematical dependency on the teeth's pitch angles B1 and B2 of pinons 21 and 31. This dependency is influenced only in such case that in the initial phase of the assembly the shifting distance x is greater than one engagement width of the pairs of gears 21, 22 or 31, 33, such that at least during part of the assembling operation one pair of gears is not in mesh with each other so as to be free to rotate relative to each other during this pase of assembly. Then, the shifting distance x which is required thereafter, is reduced by this angle of rotation or by the permissible shifting distance, respectively.

Another concept resides in that initially one meshing of the two meshings to be engaged is established completely, before the second meshing starts to be established (engaged). For example and as an alternative to the steps described above, in mounting the upper portion 7 of the gear case it is possible to initially fully engage the pinion 31 and the gear 23, whereupon by rotating the shaft 1 with the pinion 31 to the right (arrow 9), by displacement toward the operational position and with simultaneous rotating of the intermediate shaft 3 about the axis of shaft 1, without a rolling taking place within the gearings of pinion 31 and gear 23, the gearings (teeth) of pinion 33 and gear 40 come into mesh with each other. As the pinion 33 describes a circular orbit around the axis of shaft 1 during this procedure, and the path of engagement is only nearly equal to the height of the teeth, such engagement takes place approximately along a straght line. In view of the fact that this imaginary straight line, still further, passes almost through the axis of the output shaft 4, the complete engagement does not, or almost not require any rolling or camming motion of the gearings of pinion 33 and gear 40.

The fact of what type of assembling necessitates the smallest distance x of displacement of the power-distributing shaft 1, depends on the geometrical dimensions, such as teeth pitch angle B1 and B2, diameter and module of the gears in the power branches, and it may be determined mathematically. Here, the teeth pitch angles B1 and B2 are desired to be kept as small as possible, in order to avoid excessive axial forces in the intermediate shafts 2 and 3.

As described above, the shortest (minimum) distance x of displacement for a transmission gear of given dimensions may be obtained when the meshings which are established or engaged last in the assembling operation, either of pinion 31 and gear 23 or 33 and 40, show very specific and predetermined rotational angular positions at the time of contact between their head circles. To this end, it may be necessary that gears disposed on one shaft must have predetermined mutual positions; at least, during the assembling care must be taken that the gears are rotated to the optimum position.

It need not be emphasized particularly that the axial shifting distance x of the shaft 1, which is available for structural reasons, is also limited by the driving gear 10 which normally finds its place between the gears 22 and 23 of the intermediate shafts. As the gears 22 and 23 enclose between them the driven gear 40 on both sides thereof with a close spacing, in a construction of optimum compactness the value x must be only insignificantly greater than the difference between the gear width A of the power-combining gear 40 and the gear width a of the driving gear 10 (A−a).

We claim:

1. A method of assembling power-distributing two-way transmission gear means within a gear case comprising a lower portion and an upper portion forming a partition joint, said gear means comprising an axially freely adjustable shaft having fixed thereto for rotation therewith pinions with oppositely extending helical teeth, said gear means also comprising a driving gear disposed between said pinions for effecting power distribution through said axially freely adjustable shaft, said gear means also comprising two power branches with each power branch including an intermediate shaft, a driven shaft carrying thereon a driven gear and having an axis disposed with the axis of said axially freely adjustable shaft in the plane of said partition joint of said gear case, said intermediate shafts being mounted for rotation and being individually installed in said lower portion and in said upper portion, a gear and a pinion with rigid interconnection to the lower intermediate shaft, and a pinion and a gear connected to the upper intermediate shaft;

the method comprising:
placing said driven shaft into half bores of said lower portion;
placing said axially freely adjustable shaft having said pinions fixed thereto into corresponding half bores of said lower portion in a position displaced by a predetermined value in a suitable direction relative to the operational position of said axially freely adjustable shaft, whereby one of said pinions fixed to said axially freely adjustable shaft and said gear connected to said lower intermediate shaft come to mesh with each other;

pivoting said upper portion inwardly such that initially said pinion connected to said upper intermediate shaft comes into full mesh with said driven gear;

further lowering said upper portion so that said gear connected to said upper intermediate shaft comes into mesh with another of said pinions fixed to said axially freely adjustable shaft as placed into position, with said other pinion fixed to said axially freely adjustable shaft as placed into position with axial displacement; and further lowering said upper portion to reach its final position so that said other pinion of said axially freely adjustable shaft and said gear connected to said upper intermediate shaft come to full mesh with each other under rotation and axial displacement of said axially freely adjustable shaft to reach its operational position.

2. A method in accordance with claim 1 in which said pinions fixed to said axially freely adjustable shaft, said gear and said pinion with rigid interconnection to said lower intermediate shaft and said pinion and said gear connected to said upper intermediate shaft are set to assume predetermined mutual angular positions and with said driven gear have predetermined marked teeth or tooth spaces for engagement with each other, the method comprising, for the assembling of said upper portion to said lower portion, establishing predetermined gear positions of the meshing gears and pinions such that predetermined marked teeth and tooth spaces are engaged with each other.

3. A method in accordance with claim 1 comprising placing said gears and said pinions fixed to said freely axially adjustable shaft and connected to said intermediate shafts in predetermined positions relative to each other such that the meshing of said pinion fixed to said axially freely adjustable shaft with said gear connected to said upper intermediate shaft takes place in such a way that upon contact between the outer peripheral surfaces of said last-mentioned gears and pinions, one tooth of said gear connected to said upper intermediate shaft has a front face just passing by the rear face of said pinion connected to said axially freely adjustable shaft.

4. A method of assembling power-distributing two-way transmission gears within a gear case comprising a lower portion and an upper portion forming a partition joint, said gear means comprising an axially freely adjustable shaft having fixed thereto for rotation therewith pinions with oppositely extending teeth, said gear means also comprising a driving gear disposed between said pinions for effecting power distribution through said axially freely adjustable shaft, said gear means also comprising two power branches with each power branch including an intermediate shaft, a driven shaft carrying thereon a driven gear and having an axis disposed with the axis of said axially freely adjustable shaft in the plane of said partition joint of said gear case, said intermediate shafts being mounted for rotation and being individually installed in said lower portion and in said upper portion, a gear and a pinion with rigid interconnection to the lower intermediate shaft, and a pinion and a gear connected to the upper intermediate shaft;

the method comprising;

placing said axially freely adjustable shaft having said pinions fixed thereto into half bores of said lower portion in a position displaced by a predetermined value in a suitable direction relative to the operational position of said axially freely adjustable shaft, whereby one of said pinions fixed to said axially freely adjustable shaft and said gear connected to said lower intermediate shaft come to mesh with each other;

pivoting said upper portion inwardly such that initially said gear of said upper intermediate shaft comes into full mesh with another of said pinions fixed to said axially freely adjustable shaft;

then, upon further lowering of said upper portion, said pinion connected to said upper intermediate shaft coming into mesh with said driven gear; and, upon still further lowering of said upper portion to reach its final position, said driven gear and said pinion connected to said upper intermediate shaft coming into full mesh with each other under rotation and axial displacement of said axially freely adjustable shaft to reach its operational position.

5. A method in accordance with claim 4 in which said pinions fixed to said axially freely adjustable shaft, said gear and said pinion with rigid interconnection to said lower intermediate shaft and said pinion and gear connected to said upper intermediate shaft are set to assume predetermined mutual angular positions and with said driven gear have predetermined marked teeth or tooth spaces for engagement with each other, the method comprising, for the assembling of said upper portion to said lower portion, establishing predetermined gear positions of the meshing gears and pinions such that predetermined marked teeth and tooth spaces are engaged with each other.

6. A method in accordance with claim 4 comprising placing said gears and pinions fixed to said axially freely adjustable shaft and connected to said intermediate shafts in predetermined positions relative to each other such that meshing of said pinion connected to said upper intermediate shaft with said driven gear takes place in such a way that upon contact between the outer peripheral surfaces of said pinion connected to said upper intermediate shaft and said driven gear, one tooth and one tooth space face each other approximately centrally at the point of contact.

* * * * *